(12) United States Patent
Boss et al.

(10) Patent No.: US 10,386,198 B2
(45) Date of Patent: Aug. 20, 2019

(54) ADAPTIVE AUDIO GUIDANCE NAVIGATION

(71) Applicant: International Business Machines Corporation, Armonk, NY (US)

(72) Inventors: Gregory J. Boss, Saginaw, MI (US); Andrew R. Jones, Round Rock, TX (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/843,094

(22) Filed: Dec. 15, 2017

(65) Prior Publication Data

US 2018/0106634 A1 Apr. 19, 2018

Related U.S. Application Data

(63) Continuation of application No. 15/407,336, filed on Jan. 17, 2017, now Pat. No. 9,909,895, which is a
(Continued)

(51) Int. Cl.
*G01C 21/36* (2006.01)
*G01C 21/20* (2006.01)
*G01S 19/42* (2010.01)

(52) U.S. Cl.
CPC ..... *G01C 21/3641* (2013.01); *G01C 21/3629* (2013.01); *G01C 21/20* (2013.01); *G01S 19/42* (2013.01)

(58) Field of Classification Search
CPC .............. G01C 21/3641; G01C 21/3629
See application file for complete search history.

(56) References Cited

U.S. PATENT DOCUMENTS

| 5,568,390 A | 10/1996 | Hirota et al. |
| 6,622,087 B2 | 9/2003 | Anderson |

(Continued)

FOREIGN PATENT DOCUMENTS

| EP | 1681670 A1 | 7/2006 |
| EP | 2101411 A1 | 9/2009 |
| EP | 2229007 A1 | 9/2010 |

OTHER PUBLICATIONS

Chu, et al.; "Devloping a Tour Guiding Information System for Tourism Service Using Mobile GIS and GPS Techniques"; Advances in Information Sciences and Service Sciences; vol. 3; No. 6; pp. 49-58; Jul. 2011.

(Continued)

*Primary Examiner* — Alex C Dunn
(74) *Attorney, Agent, or Firm* — Edward J. Wixted, III

(57) ABSTRACT

In a method for providing adaptive audio guidance, determining, by one or more processors, a route of a computing device, wherein the route is from an initial location of the computing device to a destination. Determining, by one or more processors, an estimated time of arrival at which the computing device would arrive at the destination. Prompting, by one or more processors, a user to input a desired arrival time. Determining, by one or more processors, whether to provide audio guidance based on a determination of whether the estimated time of arrival is within a predetermined time period before the desired arrival time.

18 Claims, 9 Drawing Sheets

Related U.S. Application Data continuation of application No. 14/880,390, filed on Oct. 12, 2015, now Pat. No. 9,587,955.

(56) References Cited

U.S. PATENT DOCUMENTS

| | | | |
|---|---|---|---|
| 7,174,154 B2 | 2/2007 | Ehlers | |
| 7,991,548 B2 | 8/2011 | Singh | |
| 8,255,158 B2 | 8/2012 | O'Neill | |
| 8,498,809 B2 | 7/2013 | Bill | |
| 8,577,594 B2 | 11/2013 | Alberth, Jr. et al. | |
| 8,700,327 B2 | 4/2014 | Cabral | |
| 9,341,494 B2 | 5/2016 | Kosakowski et al. | |
| 9,360,333 B2 | 6/2016 | Tuukkanen et al. | |
| 9,587,955 B1 | 3/2017 | Boss et al. | |
| 9,612,125 B2 | 4/2017 | Goel | |
| 2005/0251325 A1 | 11/2005 | Kudo et al. | |
| 2006/0047417 A1 | 3/2006 | Tanabe | |
| 2006/0069500 A1 | 3/2006 | Hashizume | |
| 2010/0106401 A1 | 4/2010 | Naito et al. | |
| 2010/0211875 A1* | 8/2010 | Matsushita | G06F 3/0482 715/716 |
| 2012/0116669 A1 | 5/2012 | Lee et al. | |
| 2012/0310526 A1 | 12/2012 | Mizuno et al. | |
| 2013/0226457 A1 | 8/2013 | Goel | |
| 2013/0322634 A1* | 12/2013 | Bennett | G10L 21/00 381/17 |
| 2013/0322665 A1* | 12/2013 | Bennett | G08G 1/096855 381/300 |
| 2014/0100780 A1 | 4/2014 | Caine et al. | |
| 2014/0358337 A1 | 12/2014 | Ikejima et al. | |
| 2014/0358377 A1 | 12/2014 | Ikejima et al. | |
| 2014/0379261 A1 | 12/2014 | Karumuri | |
| 2015/0170310 A1 | 6/2015 | Amento et al. | |
| 2015/0253146 A1* | 9/2015 | Annapureddy | G01C 21/36 701/490 |
| 2016/0018969 A1 | 1/2016 | Sundarraman et al. | |
| 2016/0076894 A1 | 3/2016 | Choi | |
| 2016/0189541 A1 | 6/2016 | Basir | |
| 2017/0038941 A1* | 2/2017 | Pylappan | G06F 3/04815 |
| 2017/0108345 A1* | 4/2017 | Arakawa | G08G 1/096805 |
| 2017/0237852 A1* | 8/2017 | Bellavista | H04L 63/306 370/259 |

OTHER PUBLICATIONS

Wilson, et al.; "SWAN: System for Wearable Audio Navigation"; Georgia Institute of Technology.

Boss et al. "Adaptive Audio Guidance Navigation", U.S. Appl. No. 14/880,390, filed Oct. 12, 2015 (U.S. Pat. No. 9587955), 45 pages.

Boss et al. "Adaptive Audio Guidance Navigation", U.S. Appl. No. 15/407,336, filed Jan. 17, 2017, 45 pages.

Appendix P—List of IBM Patents or Patent Applications Treated as Related, Filed Herewith, 2 Pages.

\* cited by examiner

ADAPTIVE AUDIO GUIDANCE NAVIGATION

BACKGROUND OF THE INVENTION

The present invention relates generally to the field of navigation devices, and more particularly to adaptive audio guidance for navigation devices.

Global Positioning System (GPS) is a satellite-based navigation system made up of a network of satellites placed in orbit. GPS satellites circle the Earth and continually transmit messages to Earth that include the time the message was transmitted and the satellites position at the time of the message transmission. A GPS receiver uses the messages it receives from multiple satellites to determine the transit time of each message to calculate the location of the GPS receiver.

A GPS navigation device, which contains a GPS receiver, is used by a user to navigate to a destination by providing directions to the desired destination. GPS navigation devices can be in the form of portable, standalone commercial devices such as hand-held GPS units and automobile units. GPS technology is increasingly integrated into other technologies such as cameras and cellular phones. GPS-enabled devices, such as cameras and cellular phones, typically use an assisted GPS, which uses data from networks in conjunction with GPS satellites to provide a location of and to the device. Cellular networks and internet networks are examples of networks that assisted GPS-enables devices use for navigation. GPS navigation devices generally have pre-installed embedded software, which contain interactive maps such as street maps.

SUMMARY

Aspects of the present invention disclose a method for providing adaptive audio guidance. The method includes determining, by one or more processors, a route of a computing device, wherein the route is from an initial location of the computing device to a destination. The method further includes determining, by one or more processors, an estimated time of arrival at which the computing device would arrive at the destination. The method further includes prompting, by one or more processors, a user to input a desired arrival time. The method further includes determining, by one or more processors, whether to provide audio guidance based on a determination of whether the estimated time of arrival is within a pre-determined time period before the desired arrival time.

DETAILED DESCRIPTION

Embodiments of the present invention recognize that when a user uses a navigation device, such as a Global Positioning System (GPS) device, to navigate to a destination, a user may not want audio guidance for the entire route. Embodiments of the present invention allow a user to travel a determined route with limited distractions for portions of the route by muting audio guidance until audio guidance is desired.

The present invention will now be described in detail with reference to the Figures.

Figure 1:
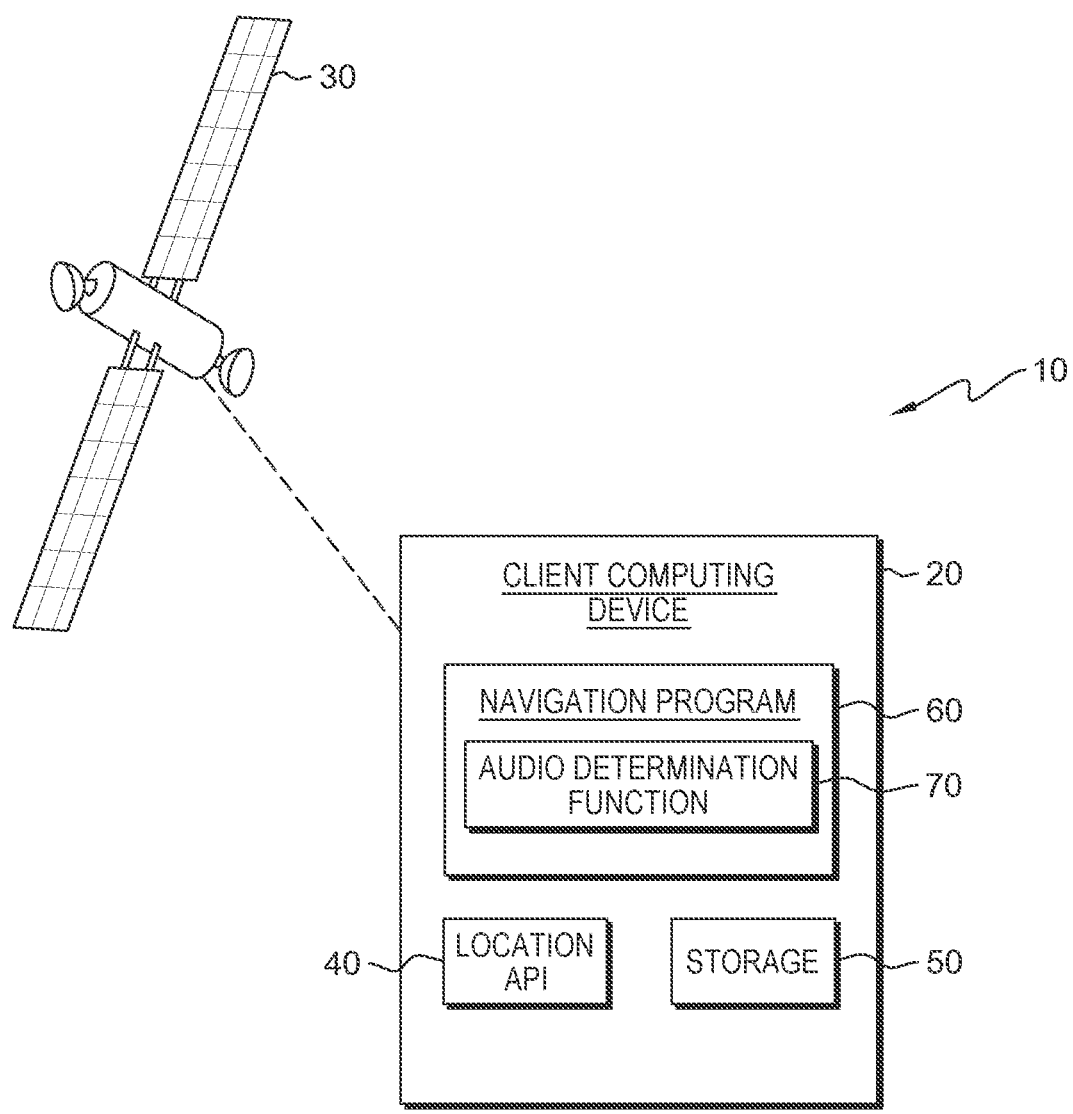
FIG. 1 depicts a functional block diagram illustrating a computing environment, in accordance with an embodiment of the present invention.

FIG. 1 depicts a diagram of computing environment 10 in accordance with one embodiment of the present invention. FIG. 1 provides an illustration of one embodiment and does not imply any limitations with regard to the environments in which different embodiments may be implemented. In the depicted embodiment, computing environment 10 includes satellites 30 and client computing device 20 in communication. Computing environment 10 may include additional computing devices, servers, or other devices not shown.

Client computing device 20 may be a laptop computer, tablet computer, personal digital assistant (PDA), smart phone, handheld GPS device, automobile GPS device, or any device capable of receiving and processing GPS signals. In general, client computing device 20 may be any electronic device or computing system capable of executing computer readable program instructions and communicating with satellites 30. In one embodiment, client computing device 20 contains location application programming interface (API) 40, storage 50, navigation program 60, and audio determination function 70. Client computing device 20 may include components, as depicted and described in further detail with respect to FIG. 9.

In an embodiment, satellites 30 represent multiple satellites of a Global Positioning System that provide messages to GPS receivers. The messages may include the position of satellites 30 and the time satellites 30 transmitted their location. A GPS receiver (not shown) uses the messages provided by satellites 30 to determine the location of client computing device 20 by performing a calculation containing the position of satellites 30 and the time satellites transmitted their location. In another embodiment, satellites 30 represent multiple satellites from an alternative satellite navigation system (e.g. GLONASS, Galileo, or BeiDou-2).

Location API 40 is an application programming interface that a program can call to receive the location of client computing device 20. Location API's are application programming interfaces that programs can use to determine the location of a device. The location API receives the geographic location of a device from a GPS receiver (not shown). A GPS receiver is integrated into or connected to client computing device 20. A GPS receiver can determine the geographic location of client computing device 20 and present the geographic location of client computing device 20 as longitude and latitude coordinates. In the depicted embodiment, location API 40 resides on client computing device 20.

In another embodiment, the geographic location of client computing device 20 is determined by a mobile operator and sent to client computing device 20 to be made available by accessing location API's (e.g., location API 40). A mobile operator may be a cellular telephone carrier if client computing device 20 is a device capable of communicating with a cellular operator (e.g., a cellular phone or a tablet). Cellular networks can determine the geographic location of a device that can communicate with cellular networks by using radio resource location services protocol. Radio resource location services protocol supports the positioning method, Enhanced Observed Time Difference (E-OTD). E-OTD is based on measurements inside the cellular telephone, where the phone measures the observed time difference of arrival of burst sent by nearby pairs of base transceiver stations.

In another embodiment, the geographic location of client computing device 20 is determined by assisted GPS (A-GPS) and made available by accessing location API's (e.g., location API 40). Data from networks, in conjunction with GPS satellites, provide the location of the client computing device 20. Cellular networks and internet networks are examples of networks that assisted GPS-enabled devices use for navigation. A-GPS is mostly dependent on an internet service provider and/or a cellular network provider. A-GPS servers, deployed by A-GPS network providers, download orbital information from satellites and stores the information in an A-GPS database. An A-GPS-enabled device can connect to A-GPS servers and download information from the servers.

In an embodiment, storage 50 is a repository that may be written and/or read by navigation program 60. Storage 50 may store data that includes, but is not limited to, previously traveled routes, maps, user preferences, and addresses. In one embodiment, storage 50 resides on client computing device 20. In other embodiments, storage 50 may reside on another computing device, provided that storage 50 is accessible to navigation program 60 over a network. The network may be a local area network (LAN), a wide area network (WAN) such as the Internet, any combination thereof, or any combination of connections and protocols that will support communications between client computing device 20 and a computing device hosting storage 50 in accordance with embodiments of the invention. The network may include wired, wireless, or fiber optic connections.

Navigation program 60 executes on client computing device 20. In an embodiment, navigation program 60 provides a user interface (not shown) to input a destination as well as user preferences, such as providing silent navigation (e.g., providing visual directions without providing audio guidance) when audio guidance is not desired by a user. In one embodiment, the user may be a pedestrian. In another embodiment, the user may be a bicyclist. In other embodiments, the user may be a traveler using any method of travel. In another embodiment, navigation program 60 executes on another device, as long as navigation program 60 has access to audio determination function 70, location API 40, and storage 50.

Navigation program 60 also determines the initial location of client computing device 20. In an embodiment, the initial location is the location of client computing device 20 when a user inputs a destination. In one embodiment, navigation program 60 calls location API 40 of client computing device 20 in order to receive the location of client computing device 20.

In an embodiment, based on the initial location of client computing device 20, individual user preferences, and a cartographic database, navigation program 60 determines a route from the initial location to the destination inputted into navigation program 60. Navigation program 60 periodically calls location API 40 of client computing device 20 to receive the location of client computing device 20 as the route is traveled and the destination is reached. A route, as determined by navigation program 60, includes a series of coordinates from the initial location of client computing device 20 to the final destination and directions for the user to follow as the user travels from the initial location to the destination, such as directions for roads to follow, turns to make, etc. In an embodiment, navigation program 60 stores the determined route in storage 50. In an embodiment, navigation program 60 may provide visual directions when audio guidance is disabled.

Audio determination function 70 operates to determine whether audio guidance should be provided to a user at a particular time or geographic location. Audio determination function 70 can receive data from location API 40, storage 50, and navigation program 60. In an embodiment, audio determination function 70 determines whether to provide the user with audio guidance on the determined route by using data from location API 40 and storage 50. The data may include routes the user previously traveled. The data may be generated by location API 40, navigation program 60, and/or the user.

In an embodiment, audio determination function 70 disables audio guidance for portions of the determined route that the user previously traveled. In an embodiment, audio determination function 70 recognizes locations that are familiar to a user. The familiar locations can encompass surrounding areas within a particular radius. In another embodiment, a user inputs familiar locations to audio determination function 70. In an embodiment, audio determination function 70 disables audio guidance for a specified radius surrounding the previously traveled route.

In other embodiments, audio determination function 70 disables audio guidance for a distance or number of turns specified by the user. In other embodiments, audio determination function 70 disables audio guidance if the user is traveling in the direction of the destination. In one embodiment, audio determination function 70 prompts the user to select locations on a determined route that the user does not desire audio guidance while navigating to the destination. The locations are identified by waypoints (positions based on geographic coordinate values, such as latitude/longitude). In another embodiment, audio determination function 70 calculates an estimated time of arrival to a determined destination and monitors the location of client computing device 20 to send the user alerts if the user will be late to the determined destination. In one embodiment, audio determination function 70 resides on client computing device 20. In other embodiments, audio determination function 70 resides on another server or another computing device, provided that audio determination function 70 is able to communicate with navigation program 60, location API 40, and storage 50.

Figure 2:
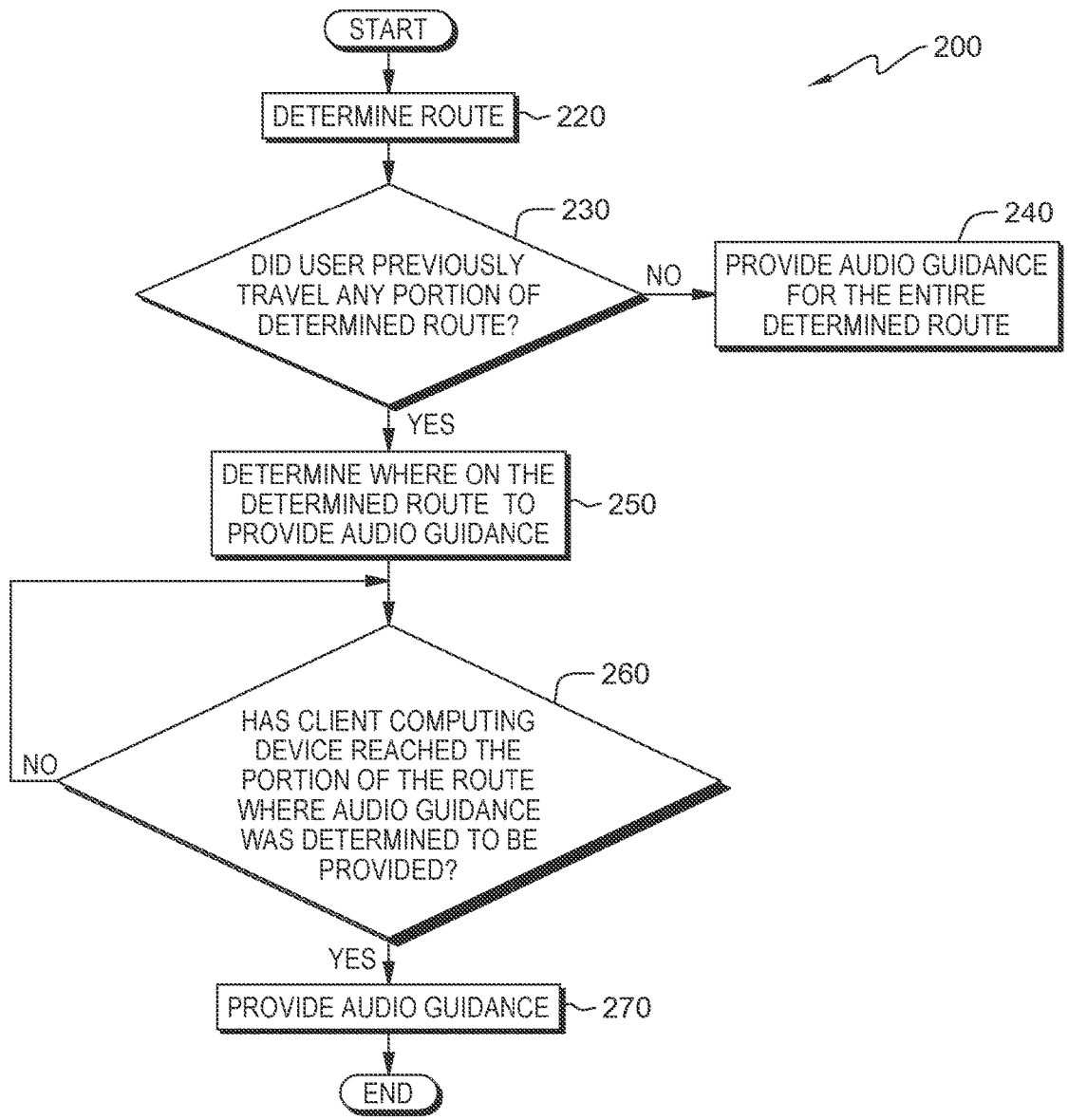
FIG. 2 depicts a flowchart of operational steps of a navigation program for providing selective audio guidance to a user in accordance with an embodiment of the present invention.

FIG. 2 is a flowchart depicting operational steps 200 of navigation program 60 executing within the computing environment of FIG. 1, in accordance with an embodiment of the present invention. Navigation program 60, via audio determination function 70, operates to disable audio guidance in areas familiar to a user. In this embodiment, based on prior driving patterns of the user, navigation program 60 selectively provides audio guidance for portions of the determined route. In one embodiment, the steps of the workflow are performed by navigation program 60 utilizing audio determination function 70. Alternatively, steps of the workflow can be performed by another program that is working with navigation program 60. Alternatively, steps of the workflow can be performed solely by audio determination function 70.

In one embodiment, initially, a user of client computing device 20 activates navigation program 60. In one embodiment, navigation program 60 is activated by the user powering on client computing device 20. In another embodiment, navigation program 60 is activated by the user opening navigation program 60 on client computing device 20 via a user interface (not shown).

In one embodiment, upon activation, navigation program 60 determines the initial location of client computing device 20 by calling API 40 to receive the location of client computing device 20.

In step 220, navigation program 60 determines a route from the initial location of client computing device 20 to a destination. In one embodiment, navigation program 60 receives an address from the user that the user wants navigation program 60 to locate and determine a navigational route to. Navigation program 60 determines the route by using algorithms and waypoints stored in storage 50. For example, the user is in Albany, N.Y. and inputs an address that is located in Syracuse, N.Y. Navigation program 60 determines a navigation route from the initial location of client computing device 20 in Albany, N.Y. to the inputted address that is located in Syracuse, N.Y.

In determination step 230, audio determination function 70 determines if the user previously traveled any portion of the determined route. In an embodiment, audio determination function 70 determines if the user has previously traveled any portion of the determined route by comparing the determined route to locations that the user has previously traveled. For example, navigation program 60 can use a track log (not shown) to record the locations a user has traveled and stores the locations in storage 50. Audio determination function 70 compares the determined route to the locations stored in storage 50 to determine if any locations in storage 50 are on the determined route. In another embodiment, audio determination function 70 determines previously traveled routes based on user input. For example, the user inputs locations the user has traveled that were not previously stored in storage 50. In yet another embodiment, audio determination function 70 determines the user previously traveled a portion of the determined route based on whether the user is familiar with certain locations.

In an embodiment, audio determination function 70 receives input from the user for the portion(s) of the determined route that the user does not want audio determination function 70 to provide audio guidance. In another embodiment, audio determination function 70 determines that a portion of the route is familiar to the user based on the number of times that the user has previously traveled through waypoints on or near the determined route that exceeds a threshold. For example, audio determination function 70 determines that a user is familiar with a portion of the determined route based on the number of times the user previously travelled that portion of the route by a number of times that exceeds a set threshold. The threshold may be a default setting, a setting based on algorithms, a setting set by a user, or a combination.

In yet another embodiment, audio determination function 70 determines that a portion of the determined route or all of the determined route is familiar to the user based on the proximity of the waypoint(s) on the determined route compared to the waypoints the user previously traveled that are stored in storage 50 or waypoints that the user inputted as familiar or previously traveled. In an embodiment, a waypoint on the determined route is familiar to the user if the proximity of the waypoint is within a determined radius of previously traveled or inputted waypoints. For example, navigation program 60 determines a route for a user. Audio determination function 70 determines that a portion of the determined route is familiar to the user since that portion of the determined route is located within a mile radius of waypoints that the user traveled a number of times that exceeds a threshold. In an embodiment, the threshold is a default setting. In another embodiment, the threshold is determined by the user. In other embodiments, the threshold is determined by a computer algorithm. In an embodiment, the length of the familiar radius is a default setting. In another embodiment, audio determination function 70 receives input from a user indicating the length of the familiar radius. In an embodiment, the familiar radius is from a designated location (e.g., a user's house or place of employment or any other destination the user frequently travels to). For example, audio determination function 70 receives input from the user that waypoints within a five mile radius of the user's home are familiar areas to the user. In another embodiment, the familiar radius is from waypoints the user has previously traveled or inputted as familiar. For example, audio determination function 70 determines waypoints within a two mile radius of previously traveled waypoints are familiar.

In an embodiment, audio determination function 70 does not provide audio guidance if the user is within a determined distance from waypoints on the determined route. For example, audio determination function 70 receives input from a user to mute audio guidance within a mile of the determined route. Audio determination function 70 does not provide audio guidance to the user if client computing device 20 deviates from the determined route provided that client computing device 20 remains within a mile of the determined route at any point along the route, from the initial starting point to the destination.

If audio determination function 70 determines the user has previously traveled a portion of the determined route, processing proceeds down the "Yes" branch to step 250.

If audio determination function 70 determines the user has not previously traveled a portion of the determined route, processing proceeds down the "No" branch to step 240. In step 240, navigation program 60 provides audio guidance for the entire determined route. In one embodiment, audio determination function 70 causes navigation program 60 to provide audio guidance from the initial location of client computing device 20 to the destination of the determined route. Processing ends when the client computing device 20 reaches the destination of the determined route.

In step 250, audio determination function 70 determines where on the determined route to provide audio guidance. In an embodiment, audio determination function 70 determines that audio guidance will be provided for portions of the determined route the user has not previously traveled.

In determination step 260, audio determination function 70 determines whether client computing device 20 has reached a portion of the determined route where audio guidance will be provided. In an embodiment, audio determination function 70 determines whether client computing device 20 has reached the portion of the determined route where audio guidance will be provided by analyzing the data that navigation program 60 periodically collects from calling location API 40 of client computing device 20. The data contains information such as the geographic location of client computing device 20 at a moment in time. The data can be stored in storage 50.

For example, audio determination function 70 determined audio guidance should be provided at the middle of the determined route. Audio determination function 70 determines that client computing device 20 is at a waypoint that is at the first quarter of the determined route. Since client computing device 20 has not reached the middle of the route, audio determination function 70 determines that client computing device 20 has not reached a portion of the determined route where audio guidance will be provided. As client computing device 20 travels toward the desired destination, navigation program 60 periodically calls location API 40 to calculate and determine client computing device 20's geographic location at the time navigation program 60 called location API 40. Navigation program 60 knows the location of client computing device 20 at any given time by calling location API 40. Based on the location of client computing device 20, audio determination function 70 determines if client computing device 20 has reached a particular location on the determined route.

If audio determination function 70 determines a user has not reached a portion of the determined route that audio determination function 70 determined audio guidance would be provided, processing proceeds down the "No" branch back to determination step 260.

If audio determination function 70 determines client computing device 20 has reached a portion of the determined route that audio determination function 70 has determined audio guidance would be provided, processing proceeds down the "Yes" branch to step 270. In step 270, audio determination function 70 causes navigation program 60 to provide audio guidance for the portion of the determined route audio determination function 70 determined audio guidance should be provided for. For example, the user wants audio guidance to begin at the middle of the navigation route. Audio determination function 70 determines that client computing device 20 has reached the middle of the determined route. Audio determination function 70 causes navigation program 60 to provide audio guidance for the user while traveling on the portion of the determined route. Processing ends when client computing device 20 arrives at the desired destination of the determined route. In another embodiment, if client computing device 20 leaves the portion of the determined route that audio determination function 70 has determined audio guidance would be provided before reaching the destination, audio guidance is disabled.

Figure 3:
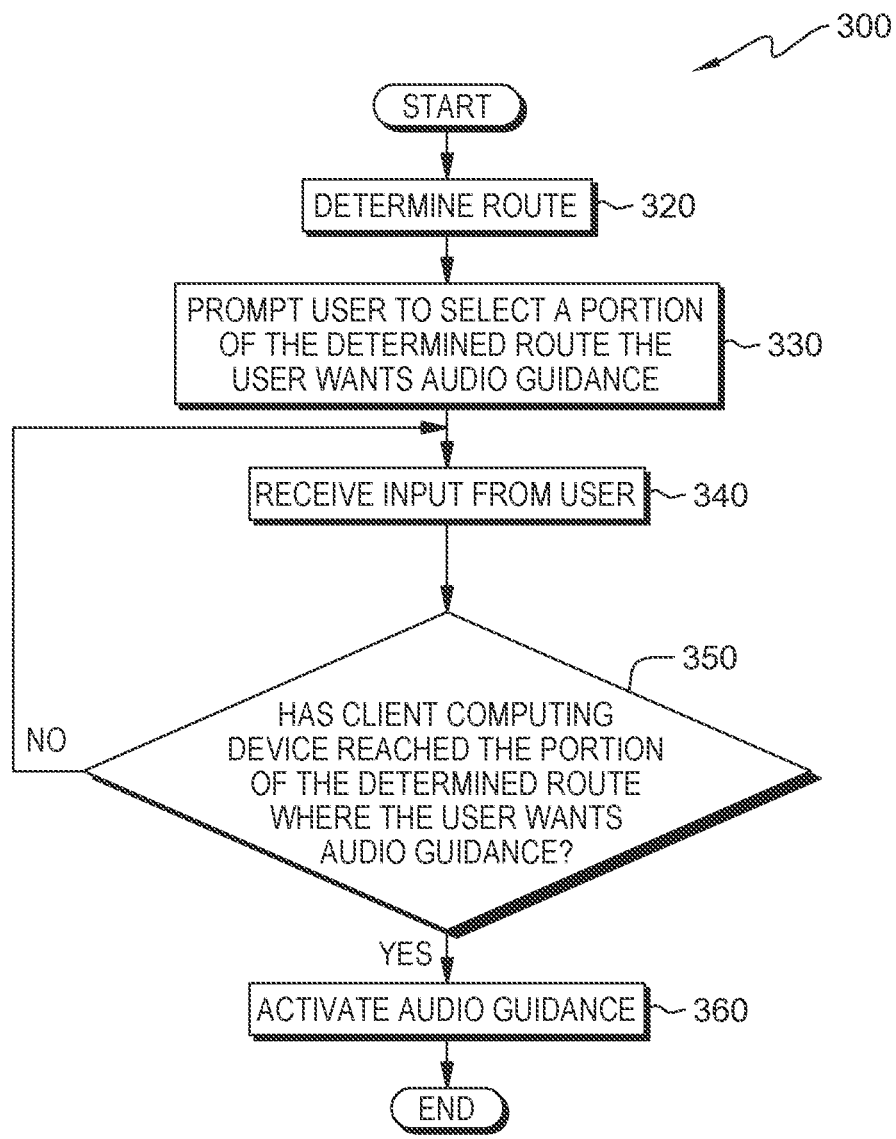
FIG. 3 depicts a flowchart of operational steps of a navigation program for providing selective audio guidance to a user in accordance with another embodiment of the present invention.

FIG. 3 is a flowchart depicting operational steps 300 of navigation program 60 executing within the computing environment of FIG. 1, in accordance with another embodiment of the present invention. Navigation program 60, via audio determination function 70, operates to selectively disable audio guidance for portions of the determined route based on input navigational program 60 receives from a user.

In this embodiment, based on input from the user, navigation program 60 selectively provides audio guidance for portions of the determined route. In an embodiment, the steps of the workflow are performed by navigation program 60 utilizing audio determination function 70. Alternatively, steps of the workflow can be performed by another program that is working with navigation program 60. Alternatively, steps of the workflow can be performed solely by audio determination function 70.

In an embodiment, initially, a user of client computing device 20 activates navigation program 60. In one embodiment, navigation program 60 is activated by the user powering on client computing device 20. In another embodiment, navigation program 60 is activated by the user opening navigation program 60 on client computing device 20 via a user interface (not shown).

In an embodiment, upon activation, navigation program 60 determines the initial location of client computing device 20 by calling API 40 to receive the location of client computing device 20.

In step 320, navigation program 60 determines a route from the initial location of client computing device 20 to a destination. In an embodiment, navigation program 60 receives an address from the user that the user wants navigation program 60 to locate and determine a navigational route for. Navigation program 60 determines the route by using algorithms and waypoints stored in storage 50. For example, the user is in Albany, N.Y. and inputs an address that is located in Syracuse, N.Y. Navigation program 60 determines a navigation route from client computing device 20's initial location in Albany, N.Y. to the inputted address that is located in Syracuse, N.Y.

In step 330, audio determination function 70 prompts the user to select a portion of the determined route the user wants navigation program 60 to provide audio guidance. In an embodiment, audio determination function 70 causes navigation program 60 to display a prompt on the screen of client computing device 20. In an embodiment, the prompt on the screen is a menu of options that the user selects from. For example, navigation program 60 prompts the user with a visual display integrated with a touchscreen interface that receives input from the user. In another embodiment, navigation program 60 gives the user an audible (voice) prompt. In other embodiments, navigation program 60 prompts the user with a combination of visual and audible prompts.

In step 340, audio determination function 70 receives input from the user. In an embodiment, audio determination function 70 receives input from the user to provide audio guidance for a measured distance or for a number of turns or steps on the determined route. The turns on the determined route include left hand and right hand turns. The steps of the determined route are the individual directions along the determined route. For example, step one instructs the user to go straight for a half of a mile. The second step instructs the user to makes a right hand turn at the intersection at the end of the half of a mile from step one. In an embodiment, audio determination function 70 provides audio guidance for any portion(s) of the determined route selected by the user.

In an example, navigation program 60 determines a route that is twenty miles long with ten steps. Audio determination function 70 receives input from the user to provide audio guidance for a measured distance of five miles, beginning at the sixth mile of the determined route and ending at the eleventh mile of the determined route. Input from the user can be in the form of a voice (audible) command, a touchscreen input, or a combination of a voice (audible) command and touchscreen input. In another example, audio determination function 70 receives input from the user to provide audio guidance, starting at the initial location of a determined route, for the first ten miles of the determined route that is twenty miles in length. In yet another example, audio determination function 70 receives input from the user to provide audio guidance for the last five miles of a determined route that is twelve miles in length. In yet another example, audio determination function 70 receives input from the user to provide audio guidance when client computing device 20 reaches the quarter point of the determined route and to stop providing audio guidance when client computing device 20 reaches the halfway point of the determined route.

In alternative embodiments, audio determination function 70 receives input from the user to provide intermittent audio guidance to the user. For example, navigation program 60 determines a route that is twenty miles long. Audio determination function 70 receives inputs from the user to provide intermittent audio guidance for multiple portions of the determined route selected by the user. Audio determination function 70 receives input from the user to provide audio guidance at the following portions of the determined route: mile two to mile four, mile five to mile eight, and mile sixteen to mile nineteen.

In an embodiment, audio determination function 70 receives input from the user to provide audio guidance for a specified number of turns or steps on a determined route. For example, audio determination function 70 receives input from the user to provide audio guidance for the first five turns of a determined route that consists of fifteen turns. In another example, audio determination function 70 receives input from the user to provide audio guidance for the last ten steps of the determined route that consists of eighteen steps.

In other embodiments, audio determination function 70 receives input from the user to provide audio guidance for any combination of turns, steps, and/or measured distance of the determined route. For example, navigation program 60 determines a route that is ten miles long and has eight turns. Audio determination function 70 receives input from the user to provide audio guidance for the first five turns of the determined route and for the last four miles of the determined route.

In determination step 350, audio determination function 70 determines whether client computing device 20 has reached the portion of the determined route where the user wants audio guidance provided. In an embodiment, audio determination function 70 determines whether client computing device 20 has reached the portion of the determined route where the user wants audio guidance provided by analyzing the data navigation program 60 periodically collects from calling location API 40 of client computing device 20. The data includes information, such as the geographic location of client computing device 20 at a moment in time. In some embodiments, the data is stored in storage 50. For example, as client computing device 20 travels toward the desired destination, navigation program 60 periodically calls location API 40 to calculate and determine the geographic location of client computing device 20 at the time navigation program 60 called location API 40. Navigation program 60 knows the location of client computing device 20 at any given time by calling location API 40. Based on the location of client computing device 20, audio determination function 70 can determine if client computing device 20 has reached a particular location on the determined route.

If audio determination function 70 determines client computing device 20 has not reached the portion of the determined route where the user wants audio guidance provided, processing proceeds down the "No" branch back to determination step 350. The process continues until client computing device 20 reaches the portion of the determined route where the user wants audio guidance provided.

If audio determination function 70 determines client computing device 20 has reached the portion of the determined route where the user wants audio guidance provided, processing proceeds down the "Yes" branch to step 360. In step 360, audio determination function 70 provides audio guidance. In an embodiment, audio determination function 70 causes navigation program 60 to provide audio guidance. For example, audio determination function 70 receives input from the user to provide audio guidance ten miles before the client computing device 20 reaches the desired destination. Navigation program 60 periodically calls location API 40 to determine where on the determined route client computing device 20 is located. When audio determination function 70 determines client computing device 20 is ten miles from the desired destination, audio determination function 70 causes navigation program 60 to provide audio guidance. Processing ends when the user arrives at the destination of the determined route. In another embodiment, if client computing device 20 leaves the portion of the determined route that audio determination function 70 has determined audio guidance would be provided before reaching the destination, audio guidance is disabled.

Figure 4:
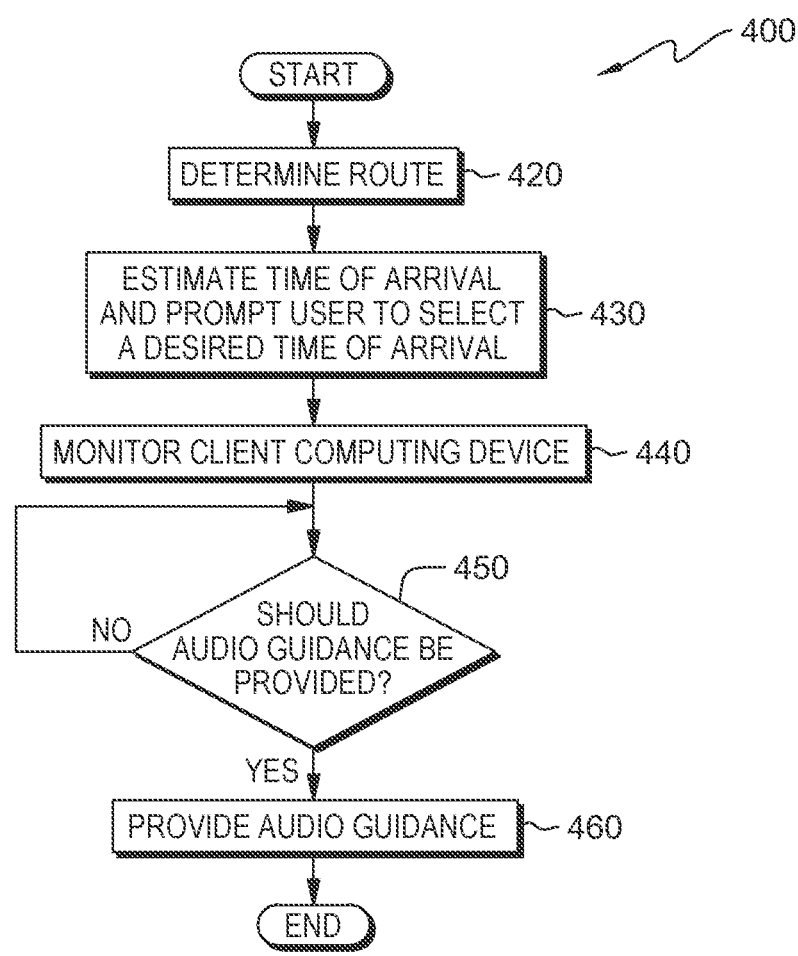
FIG. 4 depicts a flowchart of operational steps of a navigation program for providing selective audio guidance to a user in accordance with yet another embodiment of the present invention.

FIG. 4 is a flowchart depicting operational steps 400 of navigation program 60 executing within the computing environment of FIG. 1, in accordance with yet another embodiment of the present invention. Navigation program 60, via audio determination function 70, operates to selectively provide audio guidance for a determined route. In an embodiment, audio determination function 70 receives input from a user indicating the latest time the user desires to arrive at an inputted destination. Audio determination function 70 will not provide the user with audio guidance if the user deviates from the determined route provided the estimated time of arrival for the user is not within a selected timeframe before the inputted arrival time or a selected timeframe after the inputted arrival time. In an embodiment, the steps of the workflow are performed by navigation program 60 utilizing audio determination function 70. Alternatively, steps of the workflow can be performed by another program that is working with navigation program 60. Alternatively, steps of the workflow can be performed solely by audio determination function 70.

In an embodiment, initially, a user of client computing device 20 activates navigation program 60. In an embodiment, navigation program 60 is activated by the user powering on client computing device 20. In another embodiment, navigation program 60 is activated by the user opening navigation program 60 on client computer device 20 via a user interface (not shown).

In an embodiment, upon activation, navigation program 60 determines the initial location of client computing device 20 by calling API 40 to receive the location of client computing device 20.

In step 420, navigation program 60 determines a route from the initial location of client computing device 20 to the destination. In an embodiment, navigation program 60 receives an address from the user that the user wants navigation program 60 to locate and determine a navigational route for. Navigation program 60 determines the route by using algorithms and waypoints stored in storage 50. For example, the user lives in Albany, N.Y. and inputs an address that is located in Syracuse, N.Y. Navigation program 60 determines a navigation route from the initial location of client computing device 20 in Albany, N.Y. to the inputted address that is located in Syracuse, N.Y.

In step 430, navigation program 60 determines an estimated time of arrival and prompts the user to select a desired time of arrival. In an embodiment, navigation program 60 determines an estimated time of arrival from the initial location of client computing device 20 to the inputted destination and prompts the user to select a time that the user desires to arrive at the inputted destination no later than. In an embodiment, navigation program 60 determines an estimated time of arrival by taking into account information such as, but not limited to, cartographic data and the velocity client computing device 20 is traveling.

In an embodiment, audio determination function 70 prompts the user to select a time the user desires to arrive at the inputted destination no later than. In the same embodiment, audio determination function 70 also prompts the user to input how long before the inputted arrival time the user wants audio determination function 70 to provide the user with audio guidance.

For example, a user inputs a destination. Navigation program 60 determines a route and an estimated time of arrival to the destination. The estimated time of arrival from the initial location of client computing device 20 to the inputted destination is one hour. The user inputs that the user wants to arrive at the destination no later than five o'clock in the evening. The user begins traveling with client computing device 20 along the determined route to the inputted destination at one o'clock in the afternoon. The user plans to make stops and take detours while en route to the inputted destination. Audio determination function 70 receives input from the user for audio determination function 70 to alert the user with audio guidance when, based on the location of client computing device 20 and the estimated time of arrival of client computing device 20 from the location of client computing device 20 to the inputted destination, client computing device 20 will arrive at the destination thirty minutes before the desired time of arrival, five o'clock in the evening, or after, if client computing device 20 travels directly from the current location of client computing device 20, at the time of the alert, to the inputted destination without further stops or detours.

In step 440, navigation program 60 monitors the location of client computing device 20. In an embodiment, navigation program 60 monitors the location of client computing device 20 using geographic coordinate values, such as latitude/longitude. Navigation program 60 uses geographic data and algorithms to estimate the time of arrival based on the current geographic location of client computing device 20 compared to the inputted destination.

In determination step 450, audio determination function 70 determines whether to provide the user with audio guidance. In an embodiment, audio determination function 70 determines whether to provide the user with audio guidance. In an embodiment, as client computing device 20 travels toward the inputted destination, audio determination function 70 uses the data that navigation program 60 collects periodically by calling location API 40 of client computing device 20 to determine the geographic location of client computing device 20 at the time navigation program 60 called location API 40. The data includes information such as, but not limited to, the geographic location of client computing device 20 at a moment in time. The data may be stored in storage 50. Based on the location of client computing device 20, the time the user desires to arrive at the destination and/or receive audio guidance, the current time, and the estimated time of arrival from current location of client computing device 20, audio determination function 70 determines whether to provide the user with audio guidance.

In an embodiment, audio guidance is a way to alert the user that the user needs to travel directly to the destination if the user wants to arrive at the inputted destination by the inputted time. In another embodiment, audio guidance is given to the user to make the user aware of how much time the user has to arrive at the inputted destination. For example, audio determination function 70 provides the user audio guidance. The user has an additional thirty minutes to spare to arrive at the inputted destination by the inputted time from the current location of client computing device 20. The user determines to make one more stop that will take ten minutes. Afterward, the user and client computing device 20 travel directly to the inputted destination.

For example, a user inputs a destination. Navigation program 60 determines a route and an estimated time of arrival to the destination. The estimated time of arrival from the initial location of client computing device 20 to the inputted destination is one hour. The user is familiar with the determined route and does not need audio guidance. However, the user plans to make stops and take detours while en route to the inputted destination. To ensure that the user does not arrive at the destination late, audio determination function 70 receives input from the user that the user wants to arrive at the destination no later than five o'clock in the evening. Audio determination function 70 receives input from the user for audio determination function 70 to provide audio guidance to the user when, based on the location of client computing device 20 and the estimated time of arrival of client computing device 20 from the location of client computing device 20 to the inputted destination, client computing device 20 will arrive at the destination thirty minutes before the desired time of arrival, five o'clock in the evening, or after, if client computing device 20 travels directly from the current location of client computing device 20 at the time audio guidance is provided to the user to the time it would take for client computing device 20 to reach the inputted destination without further stops or detours. The user begins traveling with client computing device 20 along the determined route to the inputted destination at one o'clock in the afternoon. At four o'clock in the afternoon, client computing device 20 is 30 minutes away from the inputted destination based on the current location of client computing device 20 and the estimated time of arrival to the inputted destination. Audio determination function 70 determines to provide the user with audio guidance. The user is now aware of how much time the user has to arrive at the inputted destination. Based on the remaining time, the user decides to take a ten minute detour before traveling directly to the inputted destination.

If audio determination function 70 determines not to provide the user with audio guidance, processing proceeds down the "No" branch back to determination step 450. In an embodiment, the process continues until audio determination function 70 determines to provide the user with audio guidance or client computing device 20 reaches the destination.

If audio determination function 70 determines to provide the user with audio guidance, processing proceeds down the "Yes" branch to step 460. In step 460, audio determination function 70 provides the user with audio guidance. In an embodiment, when audio guidance is provided, audio determination function 70 informs the user of the estimated time of arrival that client computing device 20 will arrive at the inputted destination based on the current geographic location of client computing device 20. In an embodiment, audio guidance is provided in conjunction with visual guidance (shown on the screen of client computing device 20). In some embodiments, the visual guidance is in the form of a heads-up (or head-up) display (HUD) or other technology that displays a visualization for the user. In an embodiment, audio determination function 70 provides the user with audio guidance until client computing device 20 is on the determined route, traveling directly to the inputted destination. In other embodiments, audio determination function 70 provides the user with audio guidance intermittently or in set time intervals. The intervals can be a default setting or pre-selected by the user or based on an algorithm. In some embodiments, after audio determination function 70 initially determines to provide audio guidance, audio determination function 70 provides audio guidance any time client computing device 20 travels off of the determined route. In an embodiment, after audio determination function 70 initially determines to provide audio guidance, audio guidance is provided for the duration of the trip.

For example, navigation program 60 determines that the inputted destination is located an hour from the current location of client computing device 20. The user desires to arrive at the inputted destination no later than five o'clock in the evening. Audio determination function 70 receives input from the user to provide the user with audio guidance when client computing device 20 will arrive at the inputted destination a half an hour before five o'clock in the evening, based on the estimated time of arrival from the location of client computing device 20. Audio determination function 70 also receives input from the user to provide the user with audio guidance every five minutes once audio determination function 70 determines to provide the user with audio guidance. The user begins to travel with client computing device 20 at one o'clock in the afternoon. When audio determination function 70 determines client computing device 20 will arrive at the inputted destination a half an hour before five o'clock in the evening, based on the estimated time of arrival from the current location of client computing device 20, audio determination function 70 provides the user with audio guidance so that the user is aware that client computing device 20 will arrive at the destination a half an hour before five o'clock based on the current location of client computing device 20 and the estimated time of arrival from the location of client computing device 20. The user decides to make one more stop that takes five minutes. Audio determination function 70 provides the user with audio guidance five minutes after audio determination function 70 determined to provide the user with audio guidance. Afterward, the user travels directly to the destination without further detours. Audio determination function 70 no longer provides the user audio guidance in five minute intervals once client computing device 20 begins traveling directly to the inputted destination. If the user makes another detour or stop, audio determination function 70 provides the user with audio guidance again. Processing ends when client computing device 20 reaches the inputted destination.

Figure 5:
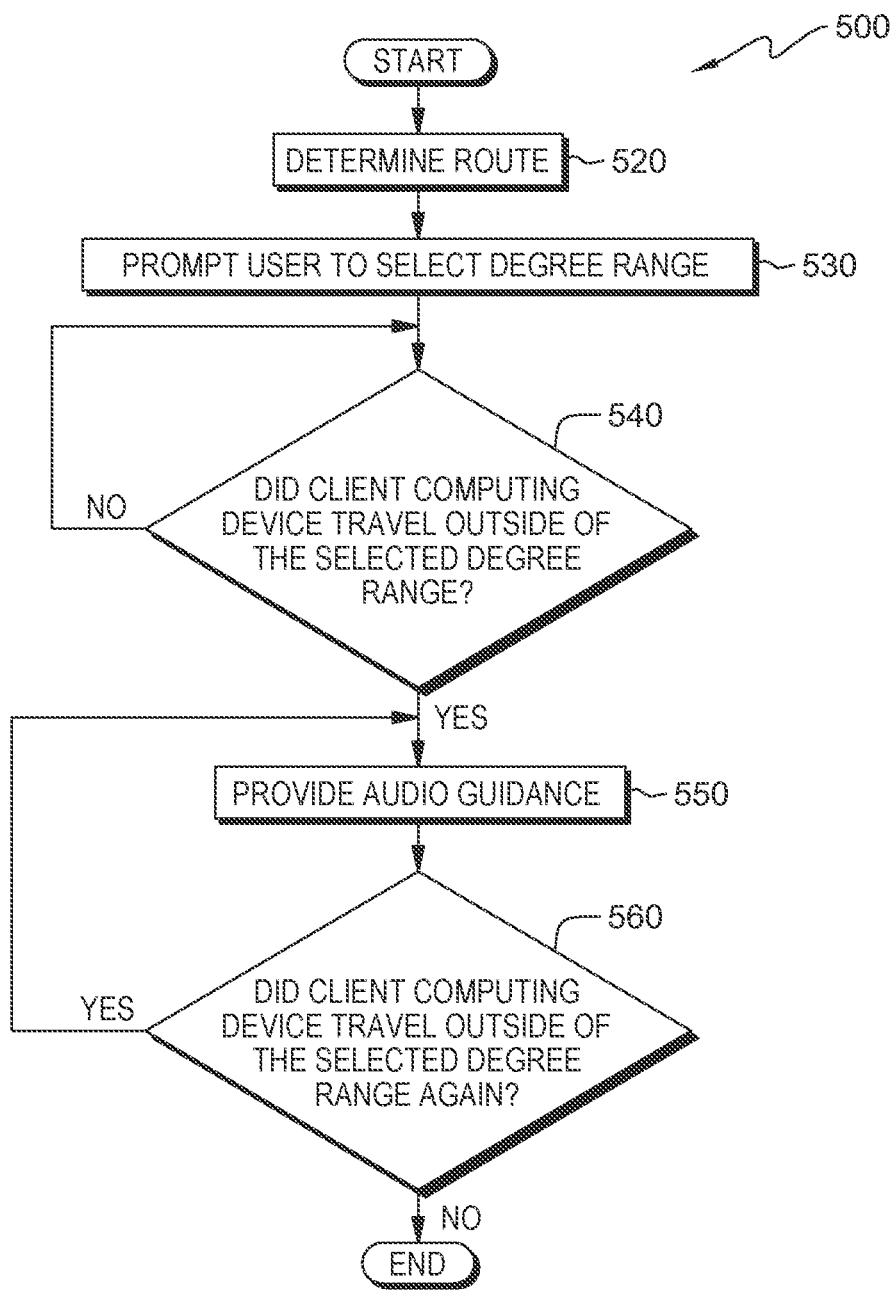
FIG. 5 depicts a flowchart of operational steps of a navigation program for providing selective audio guidance to a user in accordance with yet another embodiment of the present invention.
Figure 6:
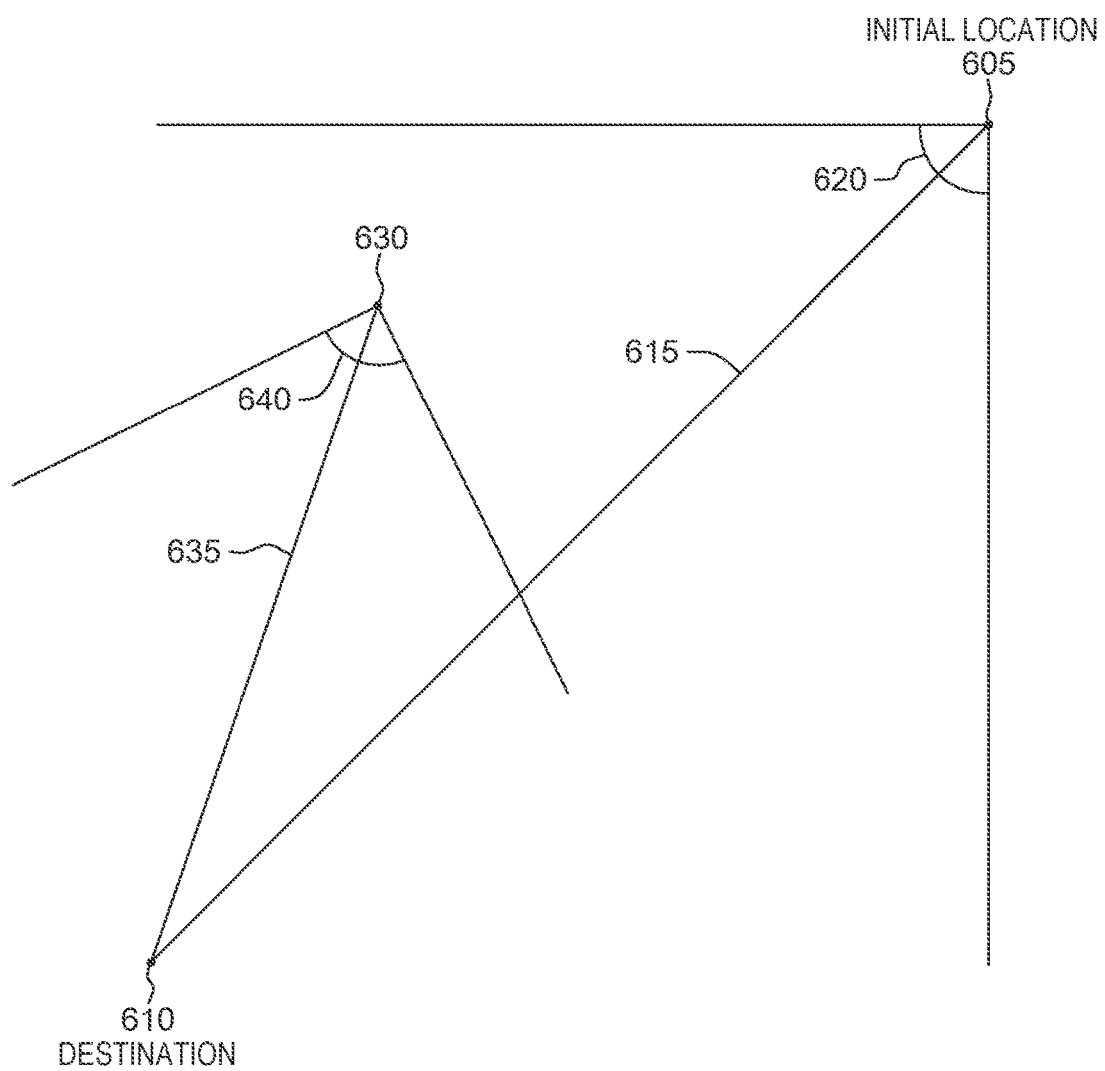
FIG. 6 depicts an exemplary view of a basic map depicting an environment in which the embodiment of FIG. 5 functions, in accordance with an embodiment of the present invention.

FIG. 5 is a flowchart depicting operational steps 500 of navigation program 60 executing within the computing environment of FIG. 1, in accordance with yet another embodiment of the present invention. Navigation program 60 operates to selectively provide audio guidance to a user based on whether the location of client computing device 20 is within an inputted degree range of a central line established from the previous location of client computing device 20 relative to the destination. In an embodiment, the steps of the workflow are performed by navigation program 60 utilizing audio determination function 70. Alternatively, steps of the workflow can be performed by another program that is working with navigation program 60. Alternatively, steps of the workflow can be performed solely by audio determination function 70. FIG. 6 depicts an exemplary view of a basic map depicting an environment in which the embodiment of FIG. 5 functions, in accordance with an embodiment of the present invention. FIG. 6 will be discussed in conjunction with the corresponding parts of FIG. 5.

In an embodiment, initially, a user of client computing device 20 activates navigation program 60. In an embodiment, navigation program 60 is activated by the user powering on client computing device 20. In another embodiment, navigation program 60 is activated by the user opening navigation program 60 on client computer device 20 via a user interface (not shown).

In an embodiment, upon activation, navigation program 60 determines the initial location of client computing device 20 by calling API 40 to receive the location of client computing device 20.

In step 520, navigation program 60 determines a route from the initial location of client computing device 20 to a destination. In an embodiment, navigation program 60 receives an address from the user that the user wants navigation program 60 to locate and determine a navigational route for. Navigation program 60 determines the route by using algorithms and waypoints stored in storage 50. For example, the user lives in Albany, N.Y. and inputs an address that is located in Syracuse, N.Y. Navigation program 60 determines a navigational route from the initial location of client computing device 20 in Albany, N.Y. to the inputted address that is located in Syracuse, N.Y.

In step 530, audio determination function 70 prompts the user to select a degree range relative to the inputted destination. In an embodiment, audio determination function 70 prompts the user to select a degree range that the user wants client computing device 20 to remain within, relative to the inputted destination, without audio guidance. For example, audio determination function 70 receives input from the user for audio determination function 70 to provide audio guidance for the user if client computing device 20 is in a location that is more than 45 degrees from either side of a central line established from the previous location to the inputted destination.

In an embodiment, the degree range is measured from a central line. The central line is a straight line (180 degrees) that is established from a previous location of client computing device 20 to the inputted destination, with the previous location and the inputted destination as endpoints of the central line. In an embodiment, the central line bisects the inputted degree range measurement. For example, audio determination function 70 receives input from the user that the user wants audio determination function 70 to provide audio guidance if client computing device 20 is in a location that is more than 45 degrees from either side of a central line established from the previous location to the inputted destination. For example, in FIG. 6, central line 615 is established between initial location 605 and destination 610. Initial location 605 and destination 610 are endpoints of central line 615. Angle 620 is 90 degrees. Central line 615 bisects angle 620. Audio determination function 70 does not provide audio guidance if client computing device 20 is in a location that is not more than 45 degrees from either side of central line 615.

In an embodiment, the position of the central line varies. The central line is relative to the previous location of client computing device 20 and the inputted destination. As client computing device 20 travels, the central line moves with client computing device 20. In FIG. 6, for example, client computing device 20 travels from initial location 605 to location 630. Central line 635 is established as the new central line. Location 630 and destination 610 are endpoints of central line 635. Angle 640 is 90 degrees.

In an embodiment, the position of the central line varies at certain intervals. For example, the central line may be moved after a certain time period, a certain distance traveled, etc. In an embodiment, audio determination function 70 monitors client computing device 20, via navigation program 60, by intermittently (e.g. intervals of time or distance) determining the current geographic location of client computing device 20. For example, navigation program 60 determines the current location of client computing device 20 every 15 seconds. In another example, navigation program 60 determines the location of client computing device 20 every half mile. In an embodiment, the time or distance interval is a default setting. In other embodiments, the time or distance interval is inputted by the user.

In determination step 540, audio determination function 70 determines if client computing device 20 traveled to a location that is outside of the inputted degree range from either side of a central line established from the previous location to the inputted destination. In an embodiment, audio determination function 70 determines if client computing device 20 traveled to a location that is outside of the inputted degree range from either side of a central line established from the previous location to the inputted destination by continually monitoring the current geographic location of client computing device 20 compared to the previous geographic location of client computing device 20, via navigation program 60. In FIG. 6, for example, audio determination function 70, via navigation program 60, determines if location 630 (current location of client computing device 20) is outside the degree range of angle 620 from either side of central line 615 established from initial location 605 (previous location) to destination 610.

If audio determination function 70 determines client computing device 20 has not traveled to a location that is outside the inputted degree range from either side of a central line established from the previous location to the inputted destination, processing proceeds down the "No" branch back to determination step 540. The process continues until client computing device 20 travels to a location that is outside the inputted degree range or has reached the destination. For example, in FIG. 6, location 630 (current location of client computing device 20) is not outside of the degree range of angle 620 from either side of central line 615 established from initial location 605 (previous location) to destination 610.

If audio determination function 70 determines client computing device 20 has traveled to a location that is outside of the inputted degree range from either side of a central line established from the previous location to the inputted destination, processing proceeds down the "Yes" branch to step 550. In step 550, audio determination function 70 provides audio guidance. In an embodiment, audio determination function 70 provides the user with audio guidance, via navigation program 60, when client computing device 20 travels to a location that is outside the inputted degree range from either side of a central line established from the previous location to the inputted destination.

In an embodiment, audio guidance may be a verbal alert to inform the user that client computing device 20 is at a location that is outside of the inputted degree range from either side of a central line established from the previous location to the inputted destination, audible directions to re-route the user, or a combination. In another embodiment, audio determination function 70 provides audio guidance in conjunction with a visual prompt. The visual prompt may be in the form of a heads-up (or head-up) display (HUD) or other technology that displays a visualization for the user.

In determination step 560, audio determination function 70 determines if client computing device 20 traveled to a location that is outside the inputted degree range from either side of a central line established from the previous location to the inputted destination again using a new central line determined after a certain interval. In an embodiment, audio determination function 70 completes processing similar to processing in determination step 540.

If audio determination function 70 determines client computing device 20 has traveled to a location that is outside of the inputted degree range from either side of a central line established from the previous location to the inputted destination again, processing proceeds down the "Yes" branch back to step 550.

If audio determination function 70 determines client computing device 20 has not traveled to a location that is outside of the inputted degree range from either side of a central line established from the previous location to the inputted destination for the remainder of the trip, processing proceeds down the "No" branch and processing ends.

In an alternative embodiment, audio determination function 70 does not provide audio guidance provided client computing device 20 is traveling closer to the inputted destination. For example, audio determination function 70 does not provide audio guidance if the estimated time of arrival is shorter than the prior location of client computing device 20. In another embodiment, audio determination function 70 does not provide audio guidance if client computing device is traveling in the direction of the inputted destination. For example, the inputted destination is located northwest of the initial location of client computing device 20. Audio determination function 70 does not provide audio guidance provided client computing device 20 is traveling north, west, or northwest.

FIG. 6 depicts an exemplary view of a basic map depicting an environment in which the embodiment of FIG. 5 functions, in accordance with an embodiment of the present invention. The depiction is a simple map. In the depicted embodiment, initial location 605 and destination 610 are endpoints of central line 615. Central line 615 is a straight line (180 degrees) that bisects angle 620. Angle 620 is 90 degrees. Each half of angle 620, relative to central line 615, is 45 degrees. Location 630 is the location client computing device 20 traveled to from initial location 605. Central line 635 is the central line for location 630. Angle 640 is 90 degrees. Central line 635 bisects angle 640. Each half of angle 640, relative to central line 635, is 45 degrees.

Figure 7:
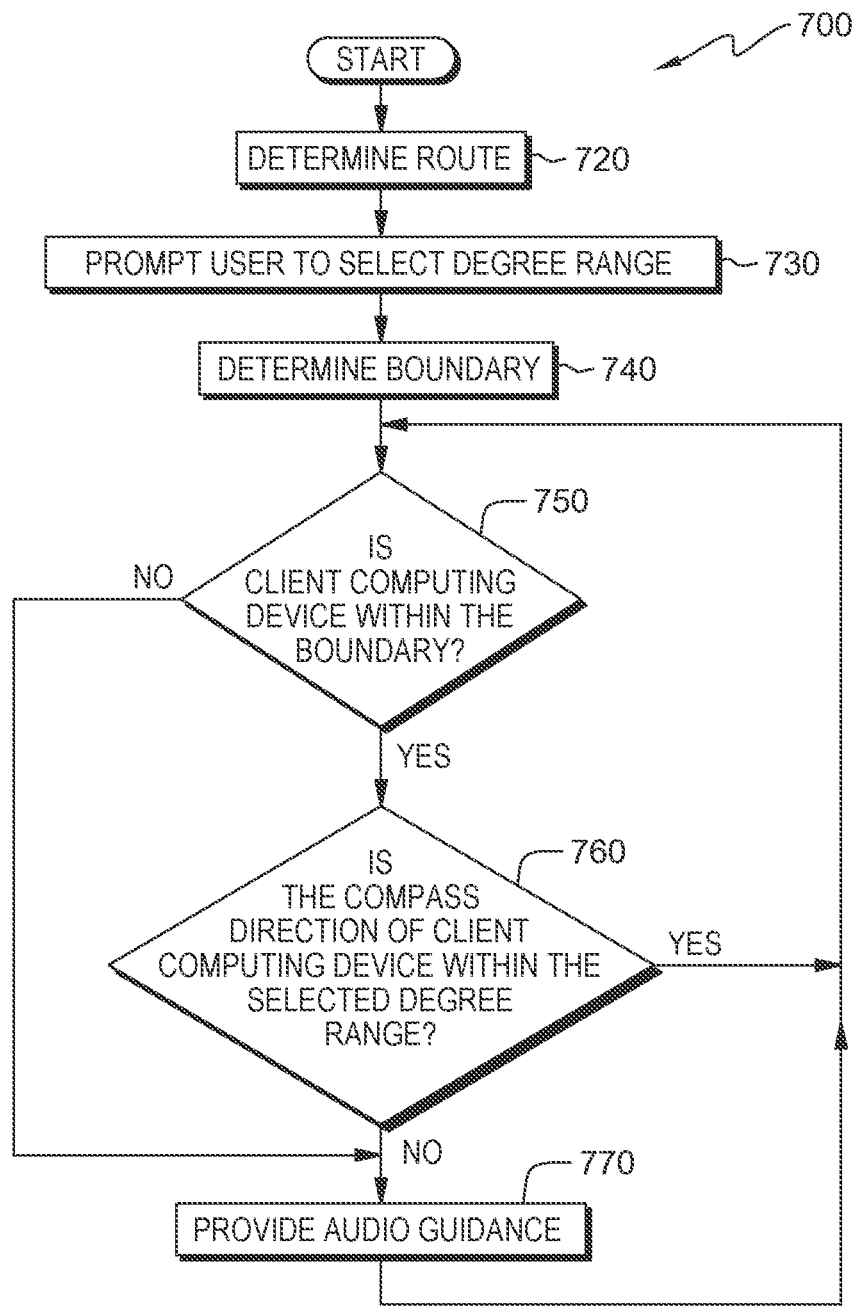
FIG. 7 depicts a flowchart of operational steps of a navigation program for providing selective audio guidance to a user in accordance with yet another embodiment of the present invention.
Figure 8:
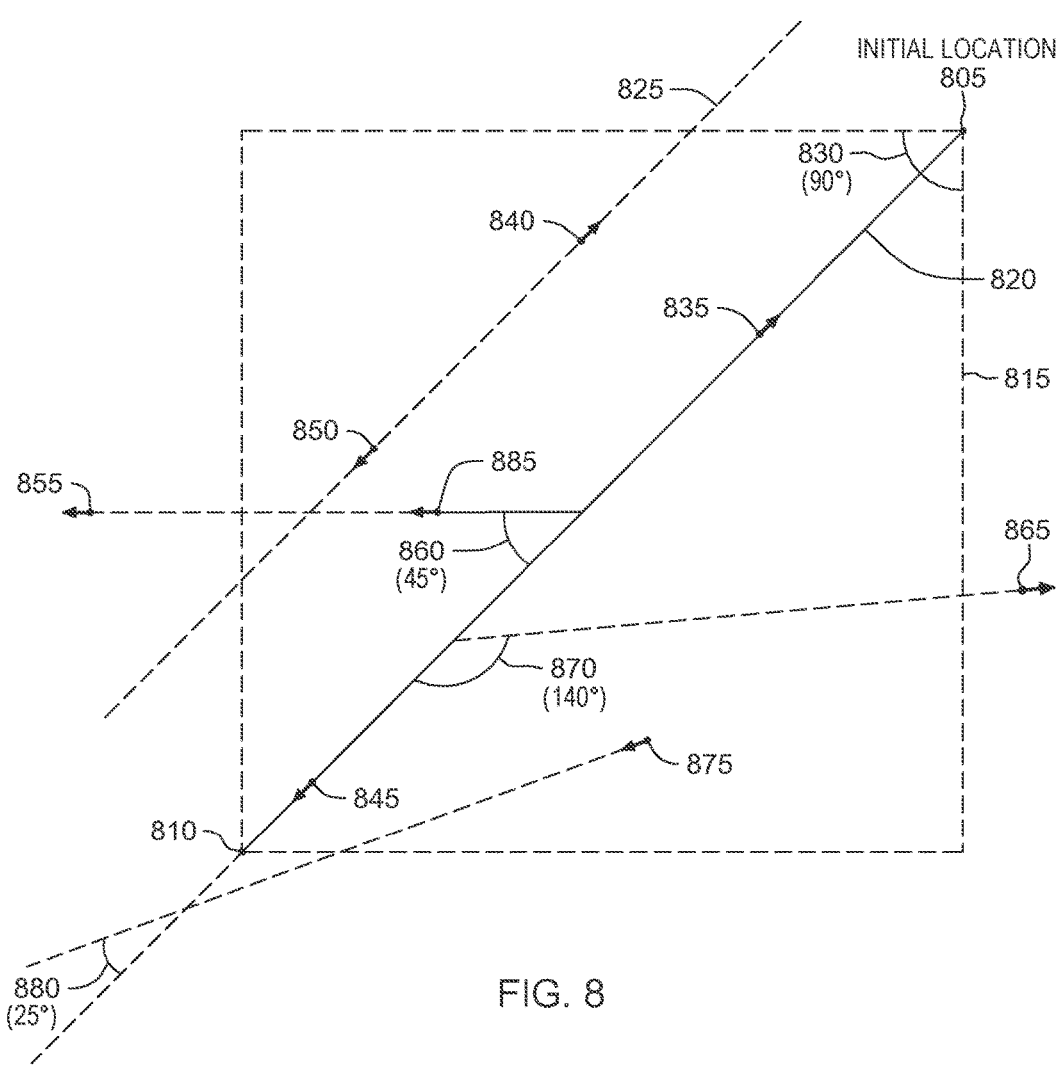
FIG. 8 depicts an exemplary view of a basic map depicting an environment in which the embodiment of FIG. 7 functions, in accordance with another embodiment of the present invention.

FIG. 7 is a flowchart depicting operational steps 700 of navigation program 60 executing within the computing environment of FIG. 1, in accordance with yet another embodiment of the present invention. Navigation program 60 operates to selectively provide audio guidance to a user based on the compass direction that client computing device 20 is traveling. In an embodiment, the steps of the workflow are performed by navigation program 60 utilizing audio determination function 70. Alternatively, steps of the workflow can be performed by another program that is working with navigation program 60. Alternatively, steps of the workflow can be performed solely by audio determination function 70. FIG. 8 depicts an exemplary view of a basic map depicting an environment in which the embodiment of FIG. 7 functions, in accordance with an embodiment of the present invention. FIG. 8 will be discussed in conjunction with the corresponding parts of FIG. 7.

In an embodiment, initially, a user of client computing device 20 activates navigation program 60. In an embodiment, navigation program 60 is activated by the user powering on client computing device 20. In another embodiment, navigation program 60 is activated by the user opening navigation program 60 on client computer device 20 via a user interface (not shown).

In an embodiment, upon activation, navigation program 60 determines the initial location of client computing device 20 by calling API 40 to receive the location of client computing device 20.

In step 720, navigation program 60 determines a route from the initial location of client computing device 20 to a destination. In an embodiment, navigation program 60 receives an address from the user that the user wants navigation program 60 to locate and determine a navigational route for. Navigation program 60 determines the route by using algorithms and waypoints stored in storage 50. For example, the user lives in Albany, N.Y. and inputs an address that is located in Syracuse, N.Y. Navigation program 60 determines a navigational route from the initial location of client computing device 20 in Albany, N.Y. to the inputted address that is located in Syracuse, N.Y.

In step 730, audio determination function 70 prompts the user to select a degree range relative to the central line. In an embodiment, audio determination function 70 prompts the user to select a degree range that the user wants the compass direction of client computing device 20 to remain within relative to the central line established from the initial location to the inputted destination. For example, audio determination function 70 receives input from the user for audio determination function 70 to provide audio guidance for the user if the compass direction of client computing device 20 is pointed in a direction at an angle that is outside of the inputted degree range of 90 degrees.

In an embodiment, the degree range is measured from a central line. The central line is a straight line (180 degrees) that is established from the initial location of client computing device 20 to the inputted destination, with the initial location and the inputted destination as endpoints of the central line. In an embodiment, the central line bisects the inputted degree range measurement. For example, audio determination function 70 receives input from the user that the user wants audio determination function 70 to provide audio guidance if the compass direction that client computing device 20 is pointed in a compass direction that is at an angle that is outside of a 90 degree range.

For example, in FIG. 8, initial location 805 and destination 810 are endpoints of central line 820. Central line 820 bisects angle 830. Angle 830 is 90 degrees. Audio determination function 70 does not provide audio guidance to the user if client computing device 20 is traveling in a compass direction that is 45 degrees of either side of central line 820, in a direction going toward the destination. In an embodiment, the inputted degree range moves along the central line. For example, the degree range remains relative to central line 820 and moves as client computing device 20 travels. If client computing device 20 is traveling in a compass direction that is at an angle that is within the degree range from the central line, audio guidance is not provided.

In an embodiment, the angle measurement used to determine whether client computing device 20 is traveling at an angle that is outside of the inputted degree range is the angle between the direction of travel and the central line, going toward the destination. The direction of travel is a line that extends in the direction client computing device 20 is traveling or facing from the current location of client computing device 20. The line of the direction of travel also extends to the central line. The angle between the direction of travel and the central line, going toward the destination, is the angle at which client computing device 20 is traveling relative to the destination and the central line.

For example, audio determination function 70 receives input from the user to provide audio guidance if client computing device 20 travels in a compass direction that is at an angle that is outside of a 90 degree range. In FIG. 8, at location 885, client computing device 20 is traveling in a compass direction that is west of central line 820. The direction of travel, of client computing device 20 from location 885, extends to central line 820. Angle 860, between the direction of travel at location 885 and central line 820, going toward the destination, is 45 degrees.

In step 740, audio determination function 70 determines a boundary. In an embodiment, audio determination function 70 determines the boundary based on the initial location, the inputted destination, and the inputted degree range. If client computing device 20 crosses the boundary, audio determination function 70 provides audio guidance. In an embodiment, the boundary prevents client computing device 20 from going in a direction that is going away from the inputted destination. In FIG. 8, for example, audio determination function 70 received input from the user that the user wants the compass direction of client computing device 20 to remain within a 90 degree range of central line 820. Based on the degree range, client computing device 20 can have a compass direction that is at an angle that is within 45 degrees of either side of central line 820, going toward destination 810. Angle 860 is 45 degrees. Angle 860 is the angle at which the compass direction of client computing device 20 is pointed at location 885 and at location 855. At location 885, client computing device 20 is traveling within the boundary and the inputted degree range. Audio determination function 70 does not provide audio guidance for the user at location 885. At location 855, audio determination function 70 provides the user with audio guidance. Although client computing device 20 has a compass direction that is pointed at an angle within the inputted degree range, client computing device 20 is traveling outside of the boundary, therefore traveling in a direction that is going away from destination 810. Audio determination function 70 provides the user with audio guidance when client computing device 20 is at location 855.

In an embodiment, the boundary spans the width and the height of the central line, taking into account the inputted degree range. The boundary prevents client computing device 20 from traveling away from the destination, even if client computing device 20 is within the inputted degree range. In FIG. 8, for example, audio determination function 70 receives input from the user to provide audio guidance if client computing device 20 has a compass direction that is pointed at an angle that is outside of a 90 degree range on the determined route. Central line 820 is established between initial location 805 and destination 810. The width between initial location 805 and destination 810 is the width of the boundary. The height between initial location 805 and destination 810 is the height of the boundary. Boundary 815 takes into account the inputted degree range. Angle 830 at initial location is 90 degrees, 45 degrees on each side of central line 820 as central line 820 bisects angle 830.

In determination step 750, audio determination function 70 determines if client computing device 20 is within the boundary. Audio determination function 70 determines if client computing device 20 is within the boundary based on analyzing the data that navigation program 60 periodically collects from calling location API 40 of client computing device 20. The data includes, but is not limited to, information such as the geographic location of client computing device 20 at a moment in time. If the current geographic location of client computing device 20 is outside of the perimeter of the boundary, audio determination function 70 determines that client computing device 20 is not within the boundary. In FIG. 8, for example, at location 855, audio determination function 70 provides the user with audio guidance. Although client computing device 20 has a compass direction that is at an angle within the inputted degree range, client computing device 20 is traveling outside of the boundary, therefore traveling in a direction that is going away from destination 810. Audio determination function 70 provides the user with audio guidance when client computing device 20 is at location 855.

If audio determination function 70 determines client computing device 20 is outside of the boundary, processing proceeds down the "No" branch to step 770. In step 770, audio determination function 70 provides audio guidance.

If audio determination function 70 determines that client computing device 20 is inside of the boundary, processing proceeds down the "Yes" branch to determination step 760.

In determination step 760, audio determination function 70 determines whether client computing device 20 is traveling (or pointed) in a compass direction that is within the selected degree range. In an embodiment, audio determination function 70 determines whether client computing device 20 is traveling in a compass direction that is within the selected degree range by using data from navigation program 60 to determine the direction client computing device 20 is facing and by measuring the angle that is formed at the intersection of the central and the extended line of the direction of travel. In FIG. 8, for example, at location 865, angle 870 is the angle at which the compass direction of client computing device 20 meets central line 820. Audio determination function 70 determines client computing device is not traveling in a compass direction that is within the degree range since angle 870, at 140 degrees, exceeds the inputted degree range and client computing device 20 is traveling northeast of destination 810, which is southwest of client computing device 20. Although the direction of travel of client computing device 20 is pointing northeast, the line of the direction of travel extends back to central line 820 to measure the angle client computing device 20 is traveling relative to central line 820. Since angle 870 exceeds the inputted degree range, audio determination function 70 provides audio guidance. At location 875, angle 880 is the angle at which the compass direction of client computing device 20 meets central line 820. Angle 880 is 25 degrees from central line 820. To calculate the measure of angle 880, central line 820 and the direction of travel line are extended until they intersect, since the angle is formed beyond boundary 815. Since client computing device 20 is traveling in a compass direction that is within the inputted degree range, audio determination function 70 does not provide audio guidance.

If audio determination function 70 determines client computing device 20 is not traveling in a compass direction within the inputted degree range, processing proceeds down the "No" branch to step 770.

If audio determination function 70 determines client computing device 70 is traveling in a compass direction that is within the inputted degree range, proceeding proceeds down the "Yes" branch to back to determination step 750.

In step 770, audio determination function 70 provides audio guidance. Audio determination function 70 provides the user with audio guidance via navigation program 60. Audio guidance is provided until client computing device 20 is traveling within the boundary in a compass direction that is within the inputted degree range or until client computing device 20 arrives at the destination. If client computing device 20 has not reached the destination and no longer needs audio guidance, processing continues back to determination step 750. Processing ends when client computing device 20 reaches the destination.

FIG. 8 depicts an exemplary view of a basic map depicting an environment in which the embodiment of FIG. 7 functions, in accordance with an embodiment of the present invention. The depiction is a basic map view of the inputted degree range of client computing device 20 relative to the central line. In an embodiment, initial location 805 and destination 810 are endpoints of central line 820. Central line 820 is a straight line (180 degrees) that bisects angle 830. Angle 830 is 90 degrees. Each half of angle 830, relative to central line 820, is 45 degrees. Boundary 815 is the boundary for the degree range that client computing device 20 is to stay within. Line 825 is parallel to central line 820. Client computing device at location 835 and location 840 has a compass direction pointing 180 degrees away from destination 810. Client computing device 20 at location 845 and location 850 has a compass direction pointed at an angle that is zero degrees to destination 810. At location 885 and location 855, client computing device 20 is traveling at an angle that is 45 degrees of central line 820. Angle 860 is 45 degrees. At location 865, client computing device 20 is traveling at an angle that is 140 degrees of central line 820. Angle 870 is 140 degrees. At location 875, client computing device 20 is traveling at an angle that is 25 degrees of central line 820. Angle 880 is 25 degrees.

Figure 9:
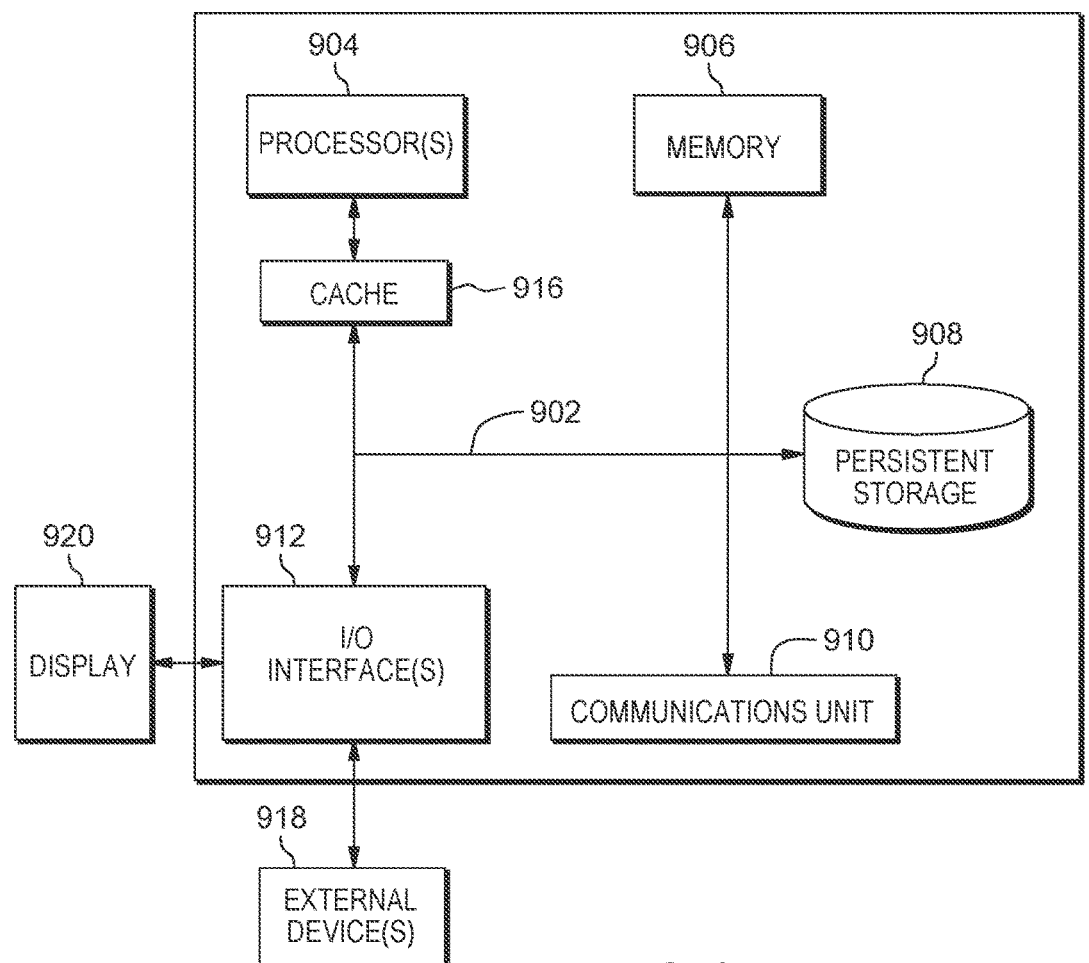
FIG. 9 is a block diagram of components of the computing device of FIG. 1, in accordance with an embodiment of the present invention.

FIG. 9 depicts a block diagram of components of client computing device 20, in accordance with an embodiment of the present invention. It should be appreciated that FIG. 9 provides only an illustration of one implementation and does not imply any limitations with regard to the environments in which different embodiments may be implemented. Many modifications to the depicted environment may be made.

Client computing device 20 may include communications fabric 902, which provides communications between cache 916, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses or a crossbar switch.

Memory 906 and persistent storage 908 are computer readable storage media. In this embodiment, memory 906 includes random access memory (RAM). In general, memory 906 can include any suitable volatile or non-volatile computer readable storage media. Cache 916 is a fast memory that enhances the performance of computer processor(s) 904 by holding recently accessed data, and data near accessed data, from memory 906.

Location API 40, storage 50, navigation program 60, and audio determination function 70 may each be stored in persistent storage 908 of client computing device 20 and in memory 906 of client computing device 20 for execution by one or more of the respective computer processors 904 via cache 916. In an embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

Communications unit 910, in these examples, provides for communications with other data processing systems or devices. In these examples, communications unit 910 includes one or more network interface cards. Communications unit 910 may provide communications through the use of either or both physical and wireless communications links. Location API 40, storage 50, navigation program 60, and audio determination function 70 may be downloaded to persistent storage 908 of client computing device 20 through communications unit 910 of client computing device 20.

I/O interface(s) 912 allows for input and output of data with other devices that may be connected to client computing device 20. For example, I/O interface 912 may provide a connection to external devices 918 such as a keyboard, keypad, a touch screen, and/or some other suitable input device. External devices 918 can also include portable computer readable storage media such as, for example, thumb drives, portable optical or magnetic disks, and memory cards. Software and data used to practice embodiments of the present invention, e.g., location API 40, storage 50, navigation program 60, and audio determination function 70, can be stored on such portable computer readable storage media and can be loaded onto persistent storage 908 of client computing device 20 via I/O interface(s) 912 of client computing device 20. I/O interface(s) 912 also connect to a display 920.

Display 920 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing adaptive audio guidance, the method comprising:
    determining, by one or more processors, a route from an initial location of a computing device;
    determining, by one or more processors, one or more previously traveled routes by a user;
    prompting, by one or more processors, the user to select a degree range relative to an inputted destination, wherein the degree range is measured from a variable central line determined from a previous location of the computing device to the inputted destination, and wherein the previous location and the inputted destination are endpoints of the variable central line;
    responsive to a determination that the computing device has traveled to a location outside of the degree range from either side of the variable central line, providing, by one or more processors, audio guidance to the user;
    determining, by one or more processors, whether the route is the same as any portion of the one or more previously traveled routes by the user; and
    providing, by one or more processors, audio guidance to the user for any portion of the route that was determined to not be the same as any portion of the one or more previously traveled routes by the user.

2. The method of claim 1, further comprising:
    transmitting, by one or more processors, the determined route to the user;
    receiving, by one or more processors, an indication from the user, wherein the indication includes one or more non audio portions of the route that the user does not want to receive audio guidance; and
    wherein the step of providing, by one or more processors, audio guidance to the user for any portion of the route that was determined to not be the same as any portion of the one or more previously traveled routes by the user comprises:
    providing, by one or more processors, audio guidance to the user for any portion of the route that was determined to not be the same as any portion of the one or more previously traveled routes by the user and not included in the non audio portion of the route.

3. The method of claim 1, wherein the step of determining, by one or more processors, whether the route is the same as any portion of the one or more previously traveled routes by the user comprises:
    determining, by one or more computer processors, whether a number of travel times of the one or more previously traveled routes by the user are above a threshold; and
    wherein the step of providing, by one or more processors, audio guidance to the user for any portion of the route that was determined to not be the same as any portion of the one or more previously traveled routes by the user comprises:
    responsive to determining the number of travel times is above the threshold, providing, by one or more processors, audio guidance to the user for any portion of the route that was determined to not be the same as any portion of the one or more previously traveled routes by the user.

4. The method of claim 1, wherein the step of determining, by one or more processors, whether the route is the same as any portion of the one or more previously traveled routes by the user comprises:
    determining, by one or more computer processors, whether a number of travel times of the one or more previously traveled routes by the user are above a threshold; and
    wherein the step of providing, by one or more processors, audio guidance to the user for any portion of the route that was determined to not be the same as any portion of the one or more previously traveled routes by the user comprises:

responsive to determining the number of travel times is below the threshold, providing by one or more processors, audio guidance to the user for the route.

5. The method of claim 3, wherein the threshold is received from the user.

6. The method of claim 1, further comprising:
determining, by one or more processors, the user has reached a destination; and,
ending, by one or more processors, audio guidance.

7. A computer program product for providing adaptive audio guidance, the computer program product comprising:
one or more computer readable storage media; and
program instructions stored on the one or more computer readable storage media, the program instructions comprising:
program instructions to determine a route from an initial location of a computing device;
program instructions to determine one or more previously traveled routes by a user;
program instructions to prompt the user to select a degree range relative to an inputted destination, wherein the degree range is measured from a variable central line determined from a previous location of the computing device to the inputted destination, and wherein the previous location and the inputted destination are endpoints of the variable central line;
responsive to a determination that the computing device has traveled to a location outside of the degree range from either side of the variable central line, program instructions to provide audio guidance to the user;
program instructions to determine whether the route is the same as any portion of the one or more previously traveled routes by the user; and
program instructions to provide audio guidance to the user for any portion of the route that was determined to not be the same as any portion of the one or more previously traveled routes by the user.

8. The computer program product of claim 7, further comprising program instructions, stored on the one or more computer readable storage media, to:
transmit the determined route to the user;
receive an indication from the user, wherein the indication includes one or more non audio portions of the route that the user does not want to receive audio guidance; and
wherein the program instructions to provide audio guidance to the user for any portion of the route that was determined to not be the same as any portion of the one or more previously traveled routes by the user comprises:
provide audio guidance to the user for any portion of the route that was determined to not be the same as any portion of the one or more previously traveled routes by the user and not included in the non audio portion of the route.

9. The computer program product of claim 7, wherein program instructions to determine whether the route is the same as any portion of the one or more previously traveled routes by the user comprises:
program instructions to determine whether a number of travel times of the one or more previously traveled routes by the user are above a threshold; and
wherein program instructions to provide audio guidance to the user for any portion of the route that was determined to not be the same as any portion of the one or more previously traveled routes by the user comprises:

program instructions, responsive to determining the number of travel times is above the threshold, to provide audio guidance to the user for any portion of the route that was determined to not be the same as any portion of the one or more previously traveled routes by the user.

10. The computer program product of claim 7, wherein program instructions to determine whether the route is the same as any portion of the one or more previously traveled routes by the user comprises:
program instructions to determine whether a number of travel times of the one or more previously traveled routes by the user are above a threshold; and
wherein program instructions to provide audio guidance to the user for any portion of the route that was determined to not be the same as any portion of the one or more previously traveled routes by the user comprises:
program instructions, responsive to determining the number of travel times is below the threshold, to provide audio guidance to the user for the route.

11. The computer program product of claim 9, wherein the threshold is received from the user.

12. The computer program product of claim 7, further comprising program instructions, stored on the one or more computer readable storage media, to:
determine the user has reached a destination; and
end audio guidance.

13. A computer system for providing adaptive audio guidance, the computer system comprising:
one or more computer processors;
one or more computer readable storage media; and
program instructions, stored on the computer readable storage media for execution by at least one of the one or more processors, the program instructions comprising:
program instructions to determine a route from an initial location of a computing device;
program instructions to determine one or more previously traveled routes by a user;
program instructions to prompt the user to select a degree range relative to an inputted destination, wherein the degree range is measured from a variable central line determined from a previous location of the computing device to the inputted destination, and wherein the previous location and the inputted destination are endpoints of the variable central line;
responsive to a determination that the computing device has traveled to a location outside of the degree range from either side of the variable central line, program instructions to provide audio guidance to the user;
program instructions to determine whether the route is the same as any portion of the one or more previously traveled routes by the user; and
program instructions to provide audio guidance to the user for any portion of the route that was determined to not be the same as any portion of the one or more previously traveled routes by the user.

14. The computer system of claim 13, further comprising program instructions, stored on the computer readable storage media for execution by at least one of the one or more processors, to:
transmit the determined route to the user;
receive an indication from the user, wherein the indication includes one or more non audio portions of the route that the user does not want to receive audio guidance; and wherein the program instructions to provide audio guidance to the user for any portion of the route that was determined to not be the same as any portion of the one or more previously traveled routes by the user comprises:

provide audio guidance to the user for any portion of the route that was determined to not be the same as any portion of the one or more previously traveled routes by the user and not included in the non audio portion of the route.

15. The computer system of claim 13, wherein program instructions to determine whether the route is the same as any portion of the one or more previously traveled routes by the user comprises:

program instructions to determine whether a number of travel times of the one or more previously traveled routes by the user are above a threshold; and wherein program instructions to provide audio guidance to the user for any portion of the route that was determined to not be the same as any portion of the one or more previously traveled routes by the user comprises:

program instructions, responsive to determining the number of travel times is above the threshold, to provide audio guidance to the user for any portion of the route that was determined to not be the same as any portion of the one or more previously traveled routes by the user.

16. The computer system of claim 13, wherein program instructions to determine whether the route is the same as any portion of the one or more previously traveled routes by the user comprises:

program instructions to determine whether a number of travel times of the one or more previously traveled routes by the user are above a threshold; and wherein program instructions to provide audio guidance to the user for any portion of the route that was determined to not be the same as any portion of the one or more previously traveled routes by the user comprises:

program instructions, responsive to determining the number of travel times is below the threshold, to provide audio guidance to the user for the route.

17. The computer system of claim 15, wherein the threshold is received from the user.

18. The computer system of claim 13, further comprising program instructions, stored on the computer readable storage media for execution by at least one of the one or more processors, to:

determine the user has reached a destination; and
end audio guidance.

* * * * *